US012304052B2

(12) United States Patent
Numata

(10) Patent No.: US 12,304,052 B2
(45) Date of Patent: May 20, 2025

(54) ELECTRIC POWER TOOL

(71) Applicant: MAKITA CORPORATION, Anjo (JP)

(72) Inventor: Fumitoshi Numata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 112 days.

(21) Appl. No.: 18/137,498

(22) Filed: Apr. 21, 2023

(65) Prior Publication Data

US 2023/0302624 A1 Sep. 28, 2023

Related U.S. Application Data

(63) Continuation of application No. 17/022,207, filed on Sep. 16, 2020, now Pat. No. 11,691,262.

(30) Foreign Application Priority Data

Sep. 26, 2019 (JP) ................................ 2019-175932
Sep. 26, 2019 (JP) ................................ 2019-175933
Sep. 26, 2019 (JP) ................................ 2019-175934

(51) Int. Cl.
*B25F 5/02* (2006.01)
*B25F 5/00* (2006.01)

(52) U.S. Cl.
CPC .............. *B25F 5/026* (2013.01); *B25F 5/008* (2013.01)

(58) Field of Classification Search
CPC ........ B24B 23/028; B25F 5/026; B25F 5/008; B25F 5/006; H02P 6/14
See application file for complete search history.

(56) References Cited

U.S. PATENT DOCUMENTS

| | | | |
|---|---|---|---|
| 10,569,406 B2 | 2/2020 | Aoki |
| 10,661,427 B2 | 5/2020 | Matsushita et al. |
| 11,489,407 B2 | 11/2022 | Suzuki et al. |
| 2010/0327685 A1 | 12/2010 | Yoshikawa et al. |
| 2012/0227527 A1 | 9/2012 | Ikuta |

(Continued)

FOREIGN PATENT DOCUMENTS

| | | |
|---|---|---|
| JP | 2007-152526 A | 6/2007 |
| JP | 2011-010530 A | 1/2011 |

(Continued)

OTHER PUBLICATIONS

Mar. 22, 2023 Search Report issued in Japanese Patent Application No. 2019-175934.

(Continued)

*Primary Examiner* — Daniel Jeremy Leeds
(74) *Attorney, Agent, or Firm* — Oliff PLC

(57) ABSTRACT

An electric power tool includes a housing, a fan, a tubular portion, and a rectifier. The housing houses a motor. The fan rotates in association with driving of the motor to generate a cooling air for the motor within the housing. The tubular portion is formed in the housing to house the fan. The rectifier is disposed to be opposed to the fan in an upstream side of the cooling air. The rectifier is divided into an inside and an outside in a radial direction of the tubular portion, the outside in the radial direction is formed of the tubular portion, and the inside in the radial direction is formed of a baffle plate assembled to the housing.

20 Claims, 13 Drawing Sheets

(56) References Cited

U.S. PATENT DOCUMENTS

| | | | | |
|---|---|---|---|---|
| 2017/0110935 | A1 | 4/2017 | Oktavec et al. | |
| 2018/0038546 | A1* | 2/2018 | Nishimiya ................ | B25F 5/00 |
| 2021/0260745 | A1 | 8/2021 | Miyazawa et al. | |
| 2021/0268636 | A1* | 9/2021 | Braun ..................... | B25F 5/006 |

FOREIGN PATENT DOCUMENTS

| | | | |
|---|---|---|---|
| JP | 2011-104765 | A | 6/2011 |
| JP | 2015-147273 | A | 8/2015 |
| JP | 2017-144539 | A | 8/2017 |
| JP | 2018-75703 | A | 5/2018 |
| JP | 2018-111185 | A | 7/2018 |
| WO | 2017/150030 | A1 | 9/2017 |
| WO | 2018/198671 | A1 | 11/2018 |

OTHER PUBLICATIONS

Mar. 28, 2023 Office Action issued in Japanese Patent Application No. 2019-175934.

Jun. 28, 2024 Office Action issued in Chinese Application No. 202011021888.9.

* cited by examiner

ELECTRIC POWER TOOL

RELATED APPLICATIONS

This application is a Continuation of U.S. patent application Ser. No. 17/022,207, filed Sep. 16, 2020, which in turn claims the benefit of Japanese Patent Application Numbers 2019-175932, 2019-175933, and 2019-175934 filed on Sep. 26, 2019, the entire contents of which are incorporated herein by reference in their entirety.

BACKGROUND OF THE INVENTION

Technical Field of the Invention

The disclosure relates to an electric power tool, such as a grinder, including a motor cooling fan.

Description of Related Art

An electric power tool, such as a grinder, has an output shaft of a motor on which a motor cooling fan is mounted. The electric power tool takes in air from outside of a housing by a rotation of the fan in association with driving of the motor to generate a cooling air for the motor, thus cooling the motor. The fan is housed in a tubular portion provided in the housing.

In this case, in order to smoothly flow the cooling air suctioned by the fan, the tubular portion of the housing is provided with a baffle plate including a cone-shaped rectifier opposed to an upstream side of the fan as disclosed in Japanese Unexamined Patent Application Publication No. 2018-111185.

The tubular portion of the housing that houses the fan is formed to expand for holding the baffle plate in some cases. In this case, the expanded portion and the baffle plate are axially overlapped and an axial length of the housing is lengthened, thus also generating a useless space. While it is possible to directly dispose the rectifier in the housing, the rectifier needs to be extended toward the center from an inner surface of the housing, and therefore, its molding is difficult.

Therefore, it is an object of the disclosure to provide an electric power tool that ensures forming a rectifier with an axially compact and space-saving structure.

SUMMARY OF THE INVENTION

In order to achieve the above-described object, an electric power tool is provided. The electric power tool includes a housing, a fan, a tubular portion, and a rectifier. The housing houses a motor. The fan rotates in association with driving of the motor to generate a cooling air for the motor within the housing. The tubular portion is formed in the housing to house the fan. The rectifier is disposed to be opposed to the fan in an upstream side of the cooling air. The rectifier is divided into an inside and an outside in a radial direction of the tubular portion, the outside in the radial direction is formed of the tubular portion, and the inside in the radial direction is formed of a baffle plate assembled to the housing.

In another aspect of the disclosure, which is in the above configuration, the baffle plate may have an abutting portion that abuts on a stator of the motor in an axial direction of the stator.

In another aspect of the disclosure, which is in the above configuration, the baffle plate may be screwed to the housing so that the stator is secured by the abutting portion.

In another aspect of the disclosure, which is in the above configuration, the rectifier may be provided with a screw passing portion through which a screw that screws the baffle plate passes.

In another aspect of the disclosure, which is in the above configuration, the screw passing portion may be a through hole formed through the tubular portion and the baffle plate.

In another aspect of the disclosure, which is in the above configuration, a spacer may be attachably and detachably disposed on the housing. The spacer may cover the screw passing portion after the baffle plate is screwed to form a continuous surface with the tubular portion and the baffle plate.

In another aspect of the disclosure, which is in the above configuration, the housing may have an outside to which an outer housing is coupled via an elastic body, and the spacer is formed as a part of the elastic body.

In another aspect of the disclosure, which is in the above configuration, the spacer may position the housing with respect to the elastic body.

In another aspect of the disclosure, which is in the above configuration, the screw may pass through the screw passing portion in parallel to an axis line of the housing, and may pass through the baffle plate to be screwed into the housing.

In another aspect of the disclosure, which is in the above configuration, a pair of the screw and the screw passing portion may be provided at point symmetry positions with respect to the axis line as a center.

In another aspect of the disclosure, which is in the above configuration, the elastic body may be in a ring shape.

In another aspect of the disclosure, which is in the above configuration, the outer housing may be divided into a pair of half housings.

In another aspect of the disclosure, which is in the above configuration, the housing may be coupled to the outer housing in a relatively rotatable manner via a coupling shaft extending in a predetermined direction.

In another aspect of the disclosure, which is in the above configuration, the coupling shaft may pass through the housing and may have both ends held by the outer housing via a second elastic body.

With the disclosure, the rectifier can be formed by using a part of the housing and the baffle plate, and thus avoiding the increased axial length of the housing or any useless space. Accordingly, the rectifier can be formed in an axially compact and space-saving structure.

In particular, when the abutting portion is disposed in the baffle plate to abut on the stator in the axial direction of the stator, the stator can be positioned using the baffle plate.

When the baffle plate is screwed to the housing and the stator is secured by the abutting portion, securing of the stator is ensured simultaneously with securing of the baffle plate.

When the screw passing portion is disposed in the rectifier and the screw that screws the baffle plate passes through the screw passing portion, the screw can be disposed at a position close to the housing and the stator to maintain the downsizing of the housing.

When the screw passing portion is the through hole formed through the tubular portion and the baffle plate, the screw passing portion can be formed without significantly changing the shape of the rectifier.

When the spacer is attachably and detachably disposed on the housing and the spacer covers the screw passing portion after the baffle plate is screwed to form the continuous surface with the tubular portion and the baffle plate, a function of the rectifier is not reduced even though the screw passing portion is disposed.

When the outer housing is disposed to be coupled to the outside of the housing via the elastic body and the spacer is formed as a part of the elastic body, the spacer can be easily assembled together with the elastic body.

When the spacer positions the housing with respect to the elastic body, the housing can be easily positioned using the elastic body.

DETAILED DESCRIPTION OF THE INVENTION

Figure 1:
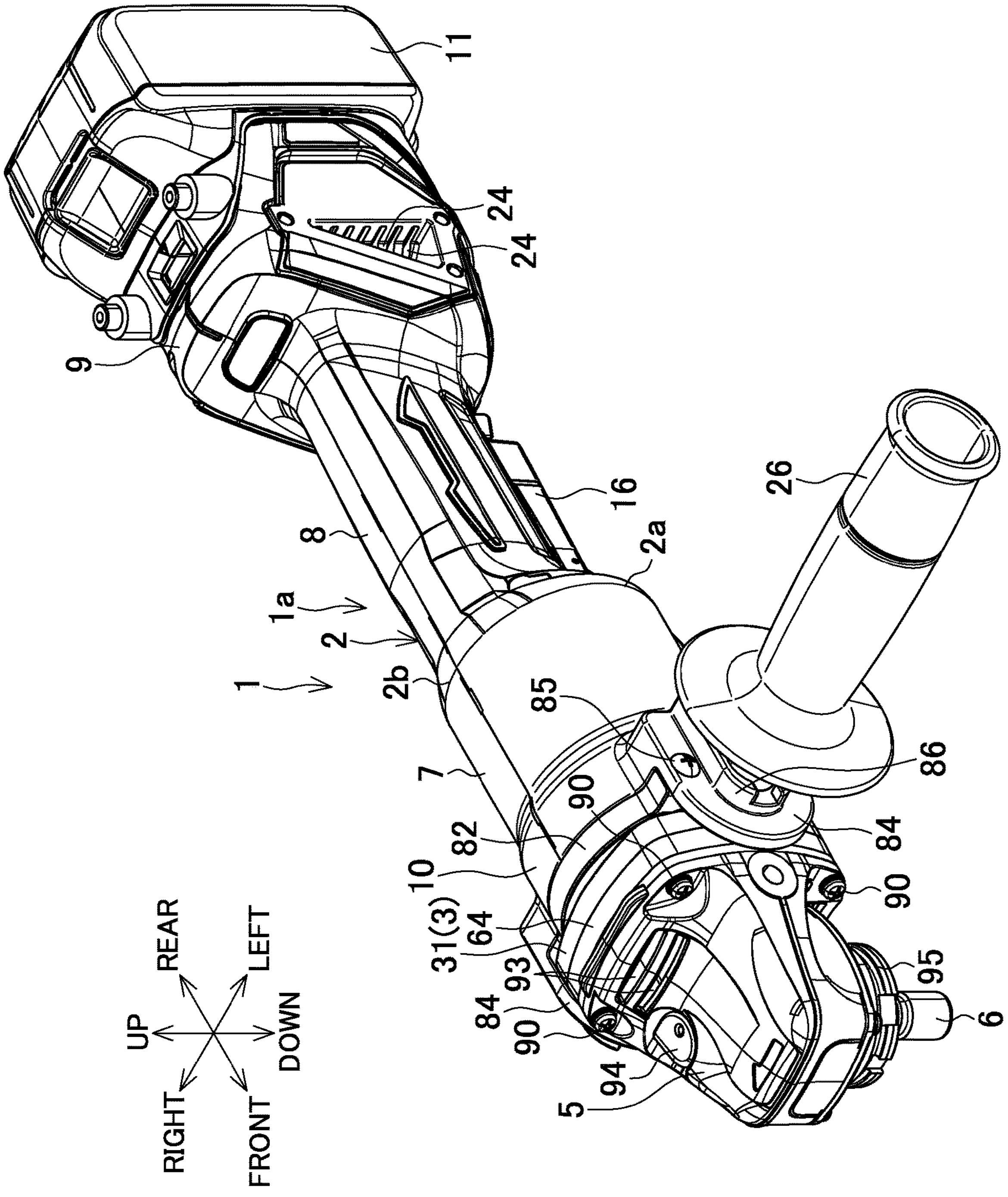
FIG. 1 is a perspective view of a grinder.
Figure 2:
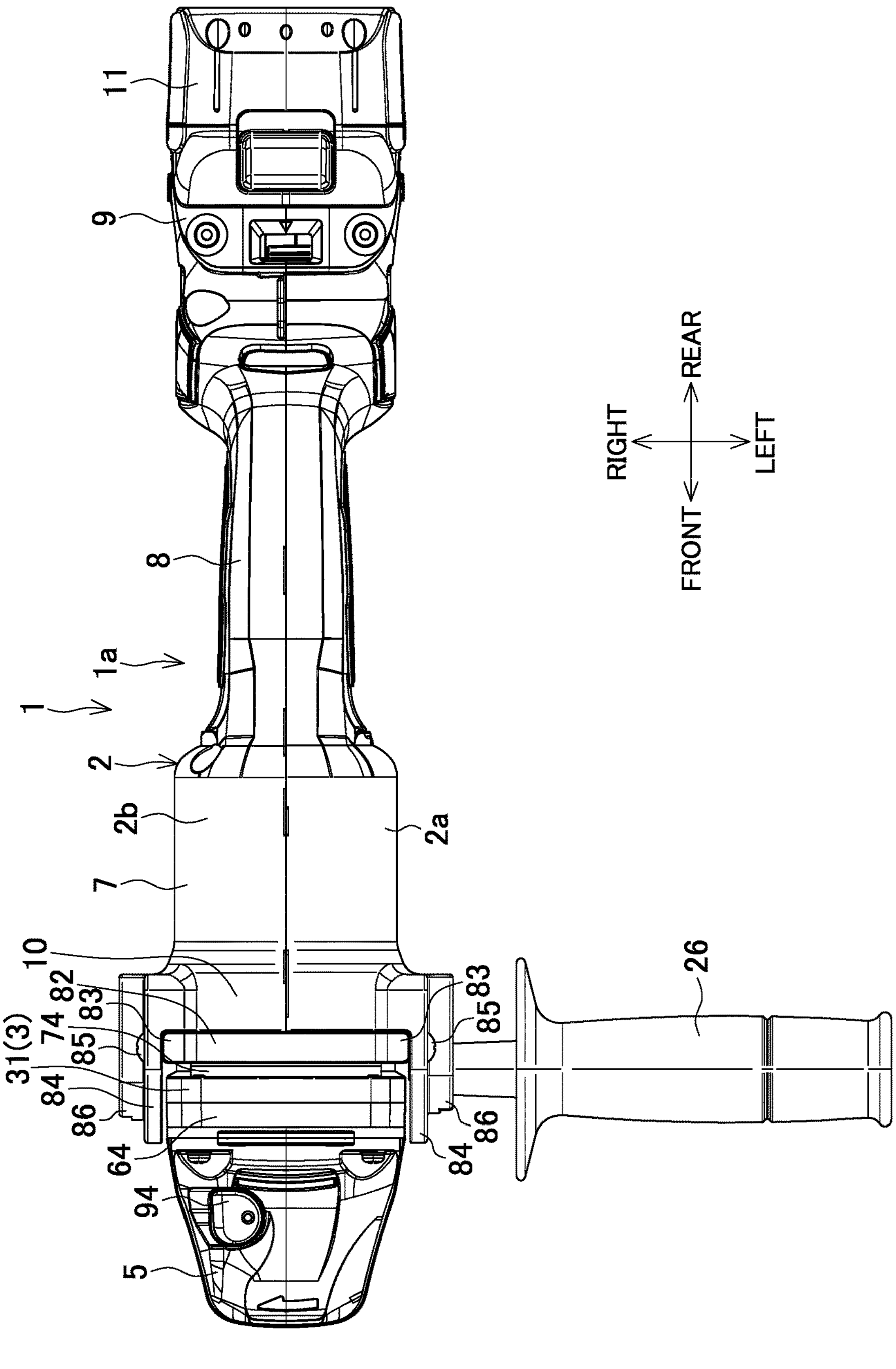
FIG. 2 is a plan view of the grinder.
Figure 3:
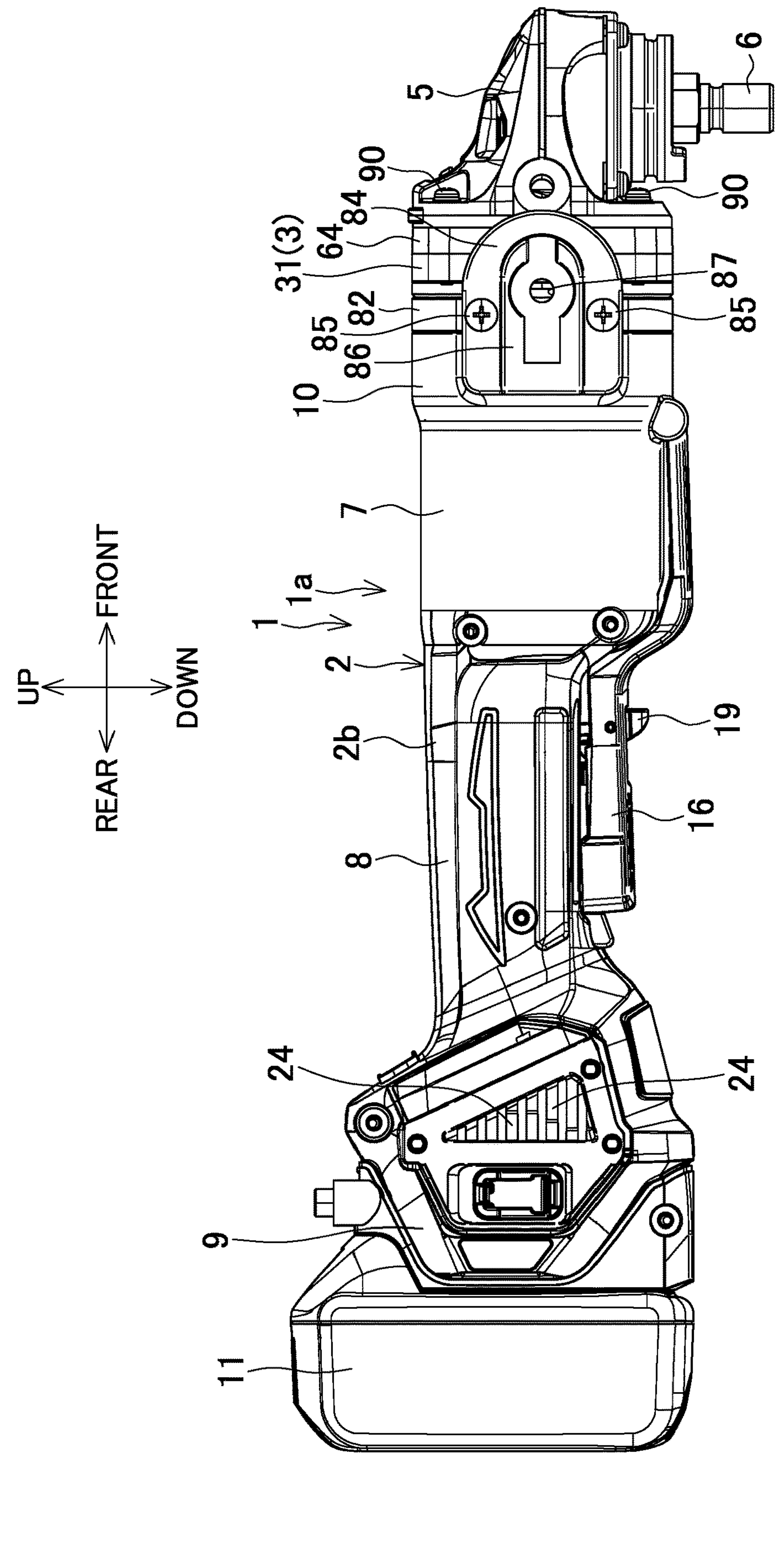
FIG. 3 is a left side view of the grinder.
Figure 4:
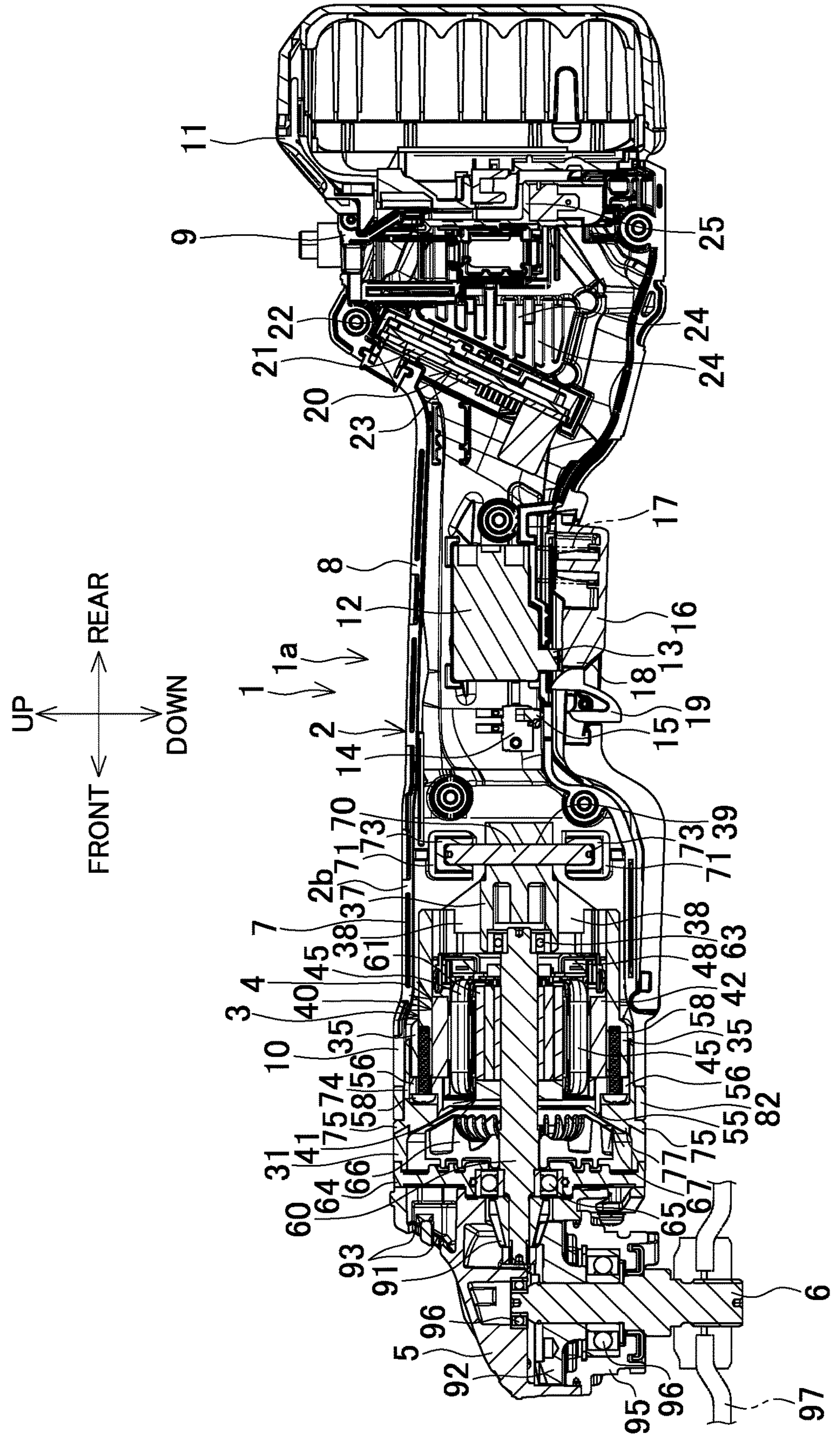
FIG. 4 is a center vertical cross-sectional view of the grinder.

The following describes embodiments of the disclosure based on the drawings. FIG. 1 is a perspective view illustrating an exemplary grinder. FIG. 2 is a plan view of the grinder. FIG. 3 is a left side view of the grinder. FIG. 4 is a center vertical cross-sectional view of the grinder.

A grinder 1 includes a tool body 1*a* extending in a front-rear direction. The tool body 1*a* has a front portion where a spindle 6 is downwardly disposed. The spindle 6 has a lower end where a tool bit 97, such as a disk-shaped grinding wheel, is mountable.

Figure 5:
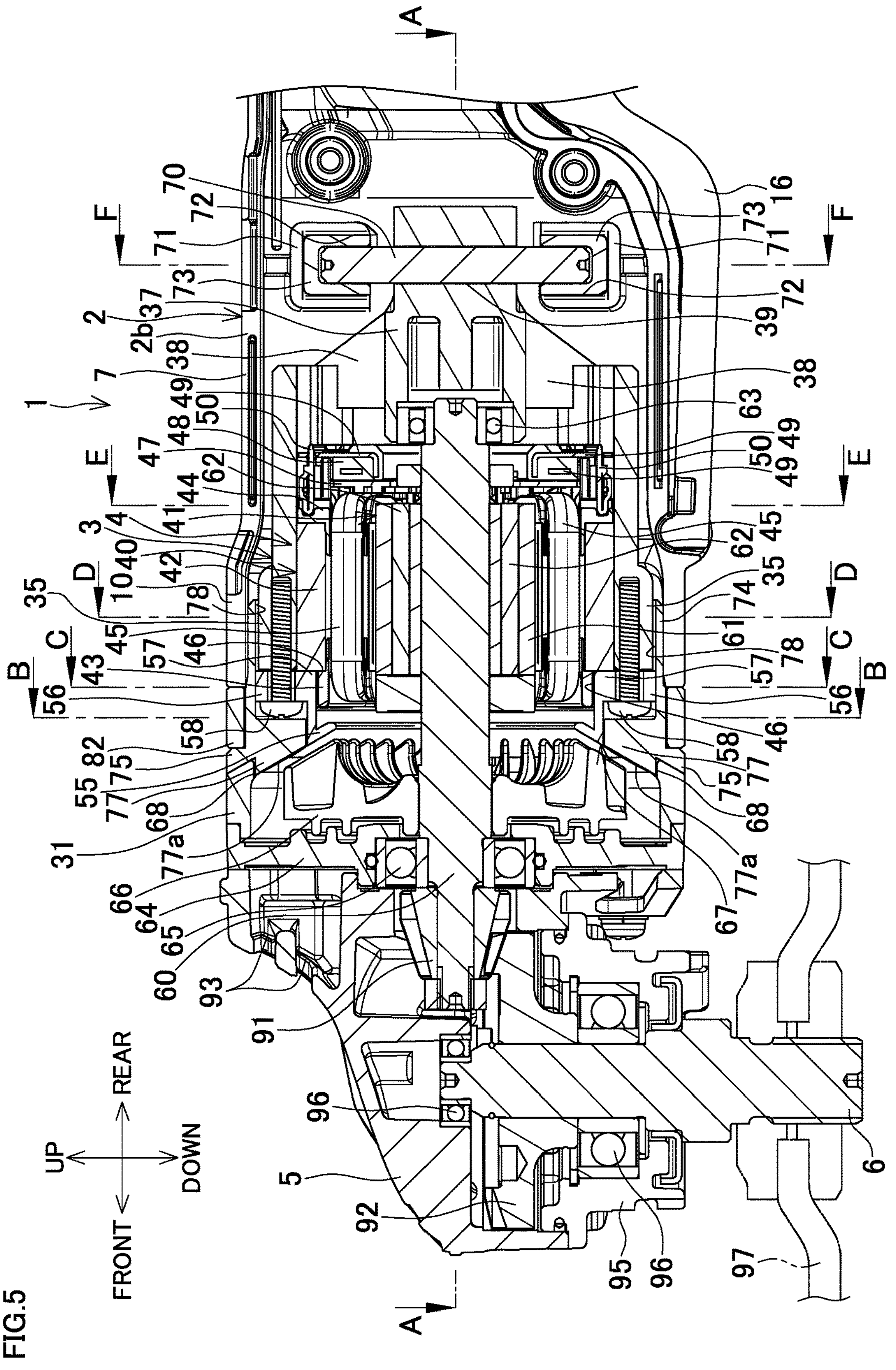
FIG. 5 is an enlarged view of a front side portion of the grinder in FIG. 4.

The tool body 1*a* includes a tubular-shaped outer housing 2 and a tubular-shaped inner housing 3 held in a front side of the outer housing 2. The inner housing 3 holds a brushless motor 4 and projects forward from the outer housing 2, as illustrated in FIG. 5. The tool body 1*a* further includes a gear housing 5 coupled to a front portion of the inner housing 3. The spindle 6 downwardly projects from the gear housing 5.

The outer housing 2 is made of resin that integrally forms a front cylinder portion 7 with a large diameter, a rear cylinder portion 8 with a small diameter, and a battery mounting portion 9. The front cylinder portion 7 holds the inner housing 3. The rear cylinder portion 8 is formed at an upwardly eccentric position at a rear of the front cylinder portion 7. The rear cylinder portion 8 is used as a main handlebar. The battery mounting portion 9 is formed at a rear end of the rear cylinder portion 8. The outer housing 2 is formed by assembling a pair of right and left half housings 2*a* and 2*b* with screws. The front cylinder portion 7 has a front end providing a large diameter portion 10 that further expands forward. A battery pack 11 serving as a power source is mountable through sliding to the battery mounting portion 9 from an upper side.

In the rear cylinder portion 8 of the outer housing 2, a main switch 12 is disposed. The main switch 12 has a plunger 13 that downwardly projects. The main switch 12 is a mechanical contact point that electrically conducts from a terminal block 25 to a control circuit board 21 by an ON operation. The terminal block 25 and the control circuit board 21 are described later. In a front side of the main switch 12 and in the rear cylinder portion 8, a micro switch 14 is disposed. The micro switch 14 has a button portion 15 that downwardly projects. The micro switch 14 is an electrical contact point that electrically conducts from the control circuit board 21 to the brushless motor 4 by the ON operation. The outer housing 2 has a lower side where a switch lever 16 is disposed swingable in an up-down direction. The switch lever 16 extends rearward while bending along a lower surface shape of the rear cylinder portion 8 from the front cylinder portion 7. The front end of the switch lever 16 serves as a supporting point. The switch lever 16 is biased downward to a projected position in an ordinary state by a coil spring 17 disposed between a rear portion of the switch lever 16 and a lower surface of the rear cylinder portion 8.

The switch lever 16 includes a pressing plate 18. The pressing plate 18 pushes the plunger 13 of the main switch 12 by a pushing-in operation of the switch lever 16 upward. The switch lever 16 includes a lock off lever 19 in a front side of the pressing plate 18. The lock off lever 19 restricts the push-in of the switch lever 16 by being rotationally biased to a vertical posture in FIG. 4 in the ordinary state. The lock off lever 19 allows the push-in of the switch lever 16 by allowing a left-hand rotation in FIG. 4. Accordingly, after rotating the lock off lever 19 in the left direction with a hand and fingers gripping the rear cylinder portion 8, gripping in the switch lever 16 causes the pressing plate 18 of the switch lever 16 to push in the plunger 13 of the main switch 12. Afterwards, the lock off lever 19 pushes in the button portion 15 of the micro switch 14.

At the rear of the main switch 12, a controller 20 is housed. The controller 20 is supported in an inclined posture with a lower end positioned in the front with respect to an upper end, with respect to an axis line of the rear cylinder portion 8 of the outer housing 2. The controller 20 is formed by housing the control circuit board 21 in a dish-shaped casing 22 made of aluminum. Six FETs (not illustrated) corresponding to respective coils 45 of the brushless motor 4, a capacitor, a microcomputer (not illustrated), and the like are mounted on the control circuit board 21.

An acceleration sensor 23 is mounted on the control circuit board 21. The acceleration sensor 23 includes a three-axis acceleration sensor element. The three-axis acceleration sensor element is, for example, of a Micro Electro Mechanical System (MEMS) type including a movable electrode portion and a detection electrode portion. Here, the movable electrode portion swings corresponding to an acceleration rate applied from an outside to change a clearance between the movable electrode portion and the detection electrode portion. Then, the acceleration rate is detected based on a change in an electrostatic capacity generated between the two electrode portions corresponding to the change of the clearance.

On the right and left of the battery mounting portion 9 at the rear of the controller 20, a plurality of slit-shaped air inlets 24, 24 . . . are formed. At the rear of the air inlets 24, the terminal block 25 is held in a vertical posture. The terminal block 25 is electrically coupled to the battery pack 11 mounted through sliding from the upper side.

Thus, electronic parts excluding the brushless motor 4 are housed within the outer housing 2 at the rear of the inner housing 3.

Figure 6:
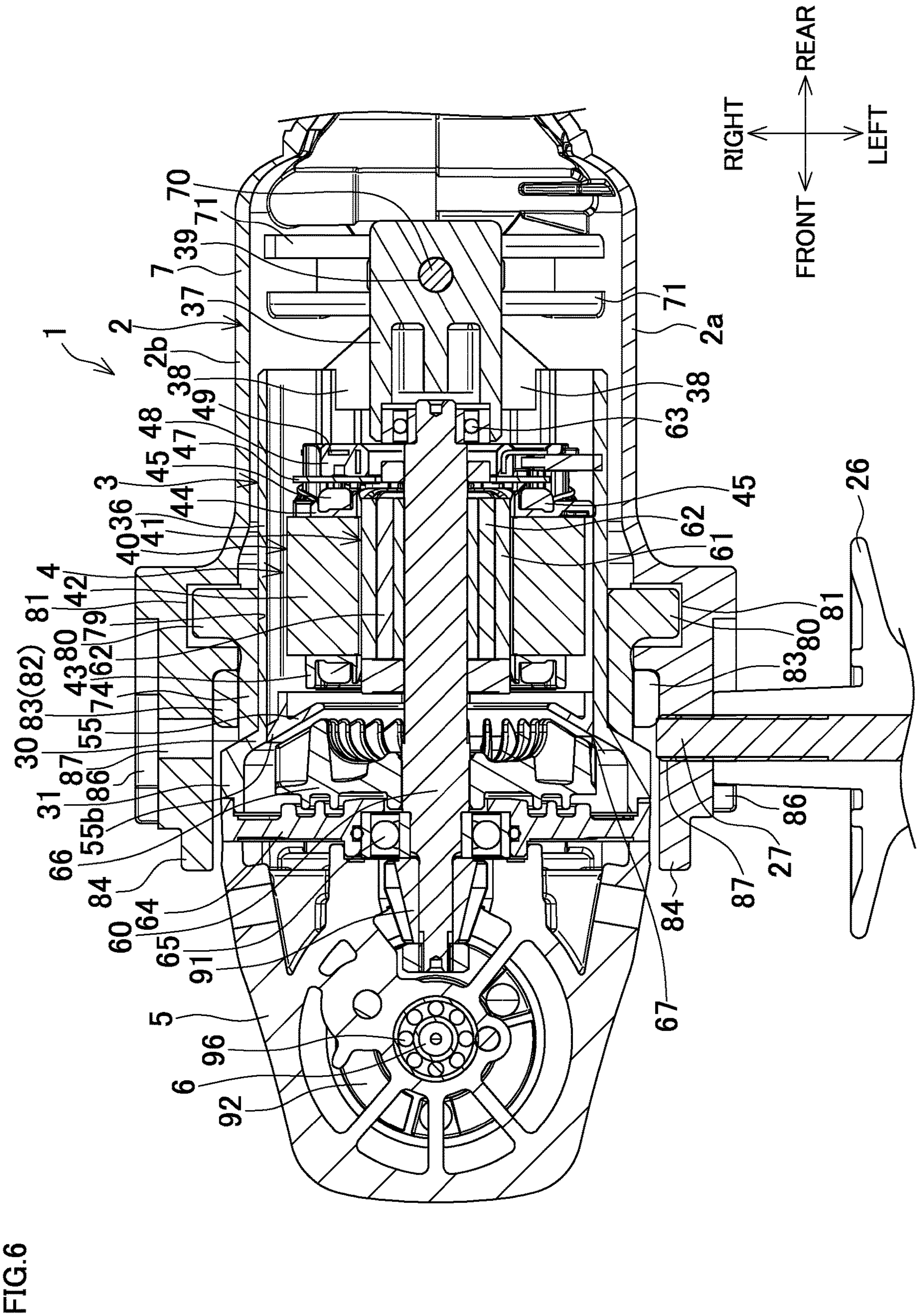
FIG. 6 is a cross-sectional view taken along a line A-A in FIG. 5.

The inner housing 3 is made of resin, and has a diameter smaller than that of the front cylinder portion 7 of the outer housing 2 to fit within the front cylinder portion 7. The inner housing 3 has a front end that projects forward from the outer housing 2. The front end of the inner housing 3 has a reversely tapered portion 30 and an expanded portion 31. The reversely tapered portion 30 increases a diameter as approaching forward and the expanded portion 31 extends forward from a front end of the reversely tapered portion 30, as illustrated in FIG. 6. The expanded portion 31 has a front view in an approximately square shape.

Figure 9B:
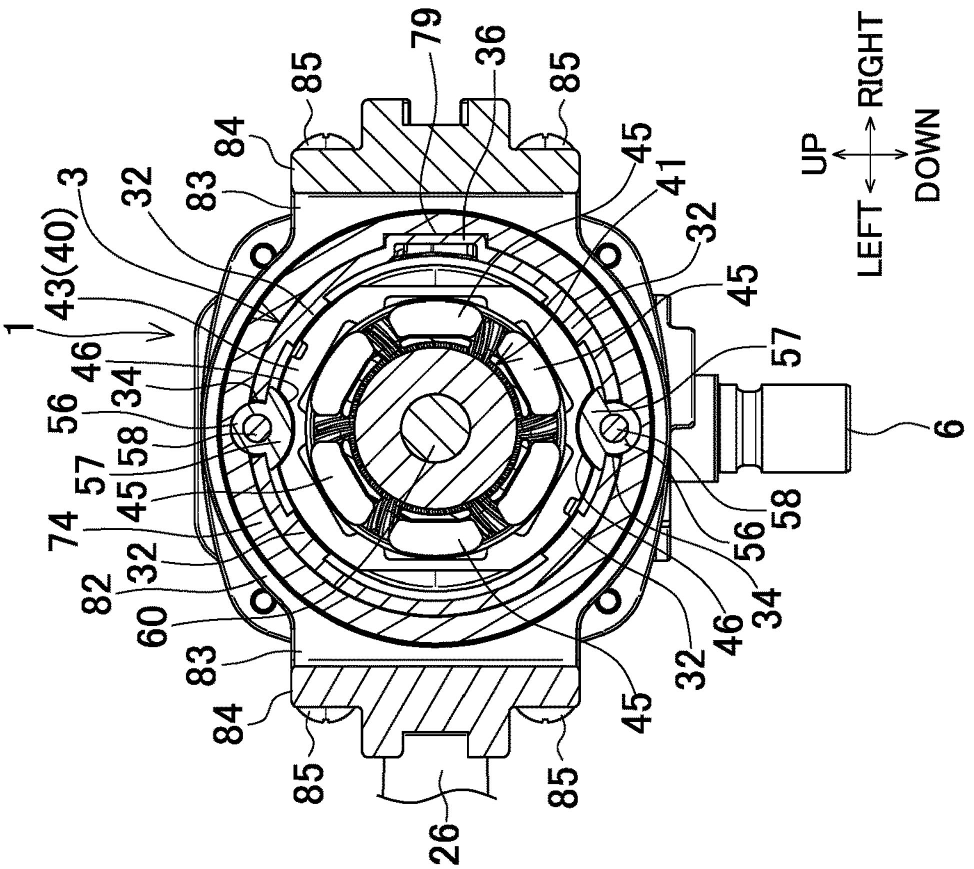
FIG. 9B is a cross-sectional view taken along a line C-C in FIG. 5.
Figure 10B:
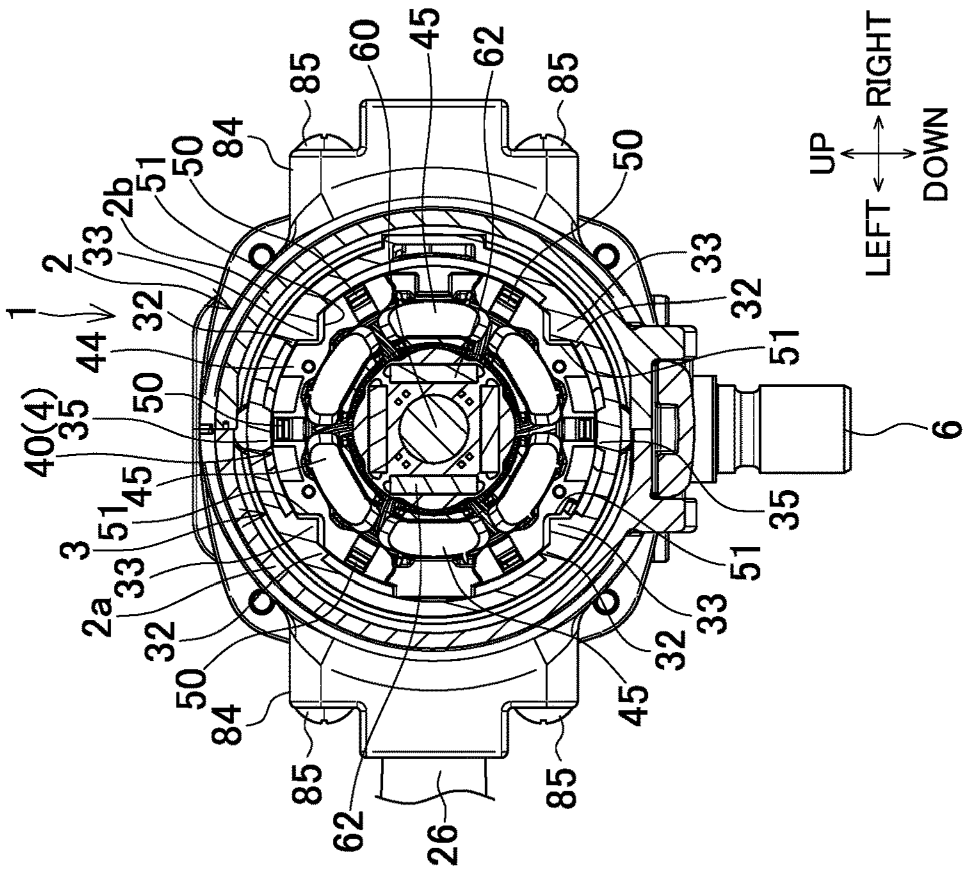
FIG. 10B is a cross-sectional view taken along a line E-E in FIG. 5.
Figure 10A:
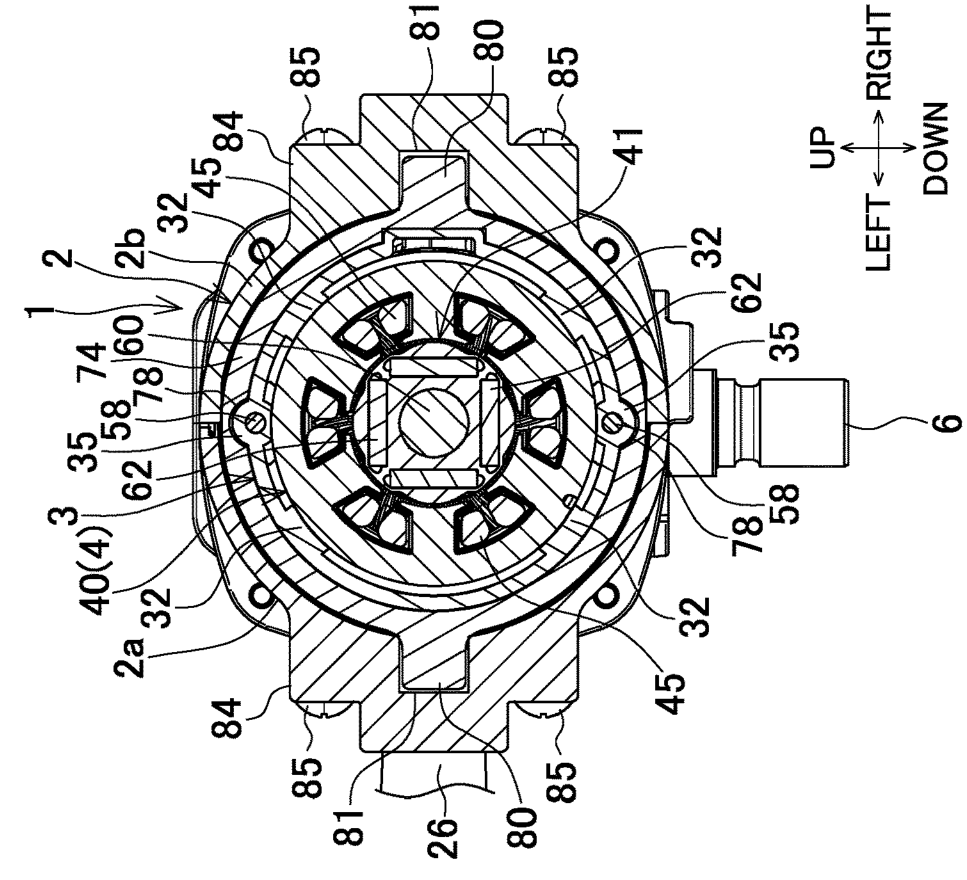
FIG. 10A is a cross-sectional view taken along a line D-D in FIG. 5.

The inner surface of the inner housing 3 has four receiving portions 32, 32 . . . that project toward an axial center side as illustrated in FIG. 7, FIG. 9B, FIG. 10A and FIG. 10B. Each of the receiving portions 32 is formed in the front-rear direction at regular intervals in a circumferential direction. The receiving portions 32 have rear portions where respective lock portions 33 are formed in lateral cross-sectional triangular shapes as illustrated in FIG. 10B. The lock portions 33 have increased amount of projections toward the axial center side compared with front portions of the receiving portions 32.

In the inner housing 3, at point symmetry positions in upper and lower sides with the axis line as a center, a pair of slits 34 and 34 are formed. Each of the slits 34 has a front end that is cut in from the reversely tapered portion 30 to extend rearward. At the rear of the slits 34 and on the extension of the front ends of the slits 34, respective screw boss portions 35 are formed. The screw boss portions 35 projects toward an outer surface of the inner housing 3.

The inner housing 3 has a right side surface where a fitting protrusion 36 is formed. The fitting protrusion 36 is in a strip shape having a predetermined width in the up-down direction, and is formed in the front-rear direction from the reversely tapered portion 30 to the rear end of the inner housing 3.

Furthermore, inside a rear portion of the inner housing 3, a bearing holder 37 with a rear portion closed is disposed. The bearing holder 37 is held onto an axial center of the inner housing 3 by four coupling plates 38, 38 . . . in radial shapes that couple to the inner surface of the inner housing 3. The bearing holder 37 has the rear portion projecting rearward from the inner housing 3. On the rear portion of the bearing holder 37, a through hole 39 that passes through in the up-down direction is provided.

Figure 7:
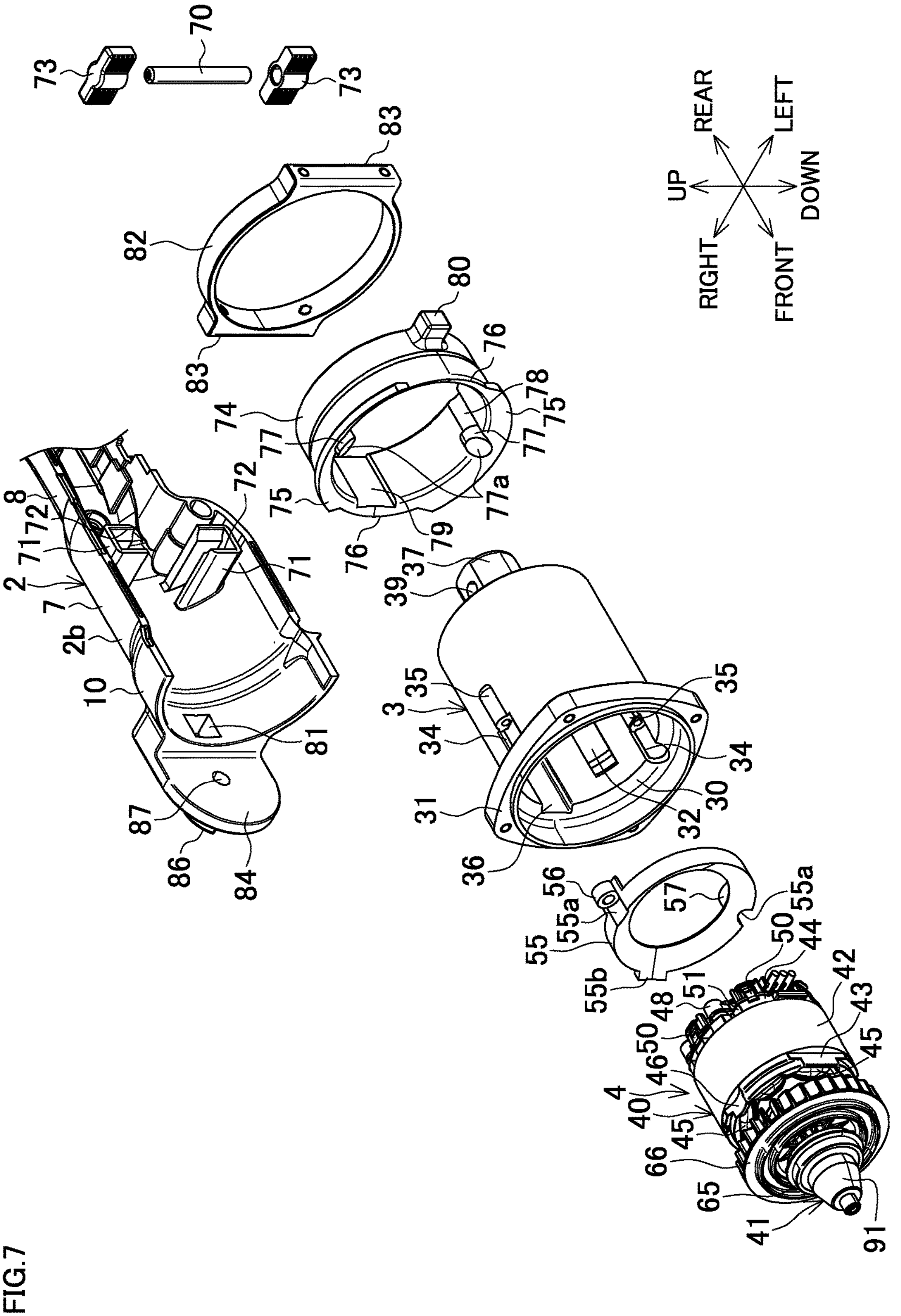
FIG. 7 is an exploded perspective view illustrating an elastic holding structure of an inner housing.

The brushless motor 4 is of an inner rotor type formed of a cylindrically-shaped stator 40 and a rotor 41 that passes through inside the stator 40. The stator 40 has a tubular-shaped stator core 42 formed of a plurality of laminated steel plates. The stator 40 has a front insulator 43 and a rear insulator 44 at end surfaces in a front and rear in the axial direction of the stator core 42. The stator 40 has the plurality of coils 45, 45 . . . wound around the stator core 42 via the front and rear insulators 43 and 44. The front insulator 43 has upper and lower surfaces where a pair of front cutout portions 46 and 46 are formed. The front cutout portions 46 have lateral cross-sectional surfaces depressed in arc shapes as illustrated in FIG. 7 and FIG. 9B.

The rear insulator 44 includes a sensor circuit board 47 that detects a position of a permanent magnet 62 inserted in a rotor core 61. In a rear side of the sensor circuit board 47 and on the rear insulator 44, a connecting member 48 is mounted. The connecting member 48 includes a terminal metal fitting 49 that connects the respective coils 45 via fusing terminals 50. The rear insulator 44 has four rear cutout portions 51, 51 . . . in accordance with the phases of the four lock portions 33 of the inner housing 3 as illustrated in FIG. 7 and FIG. 10B.

Here, the stator 40 is inserted from the front of the inner housing 3 with the four rear cutout portions 51 matching the phases to the respective four lock portions 33. Then, the lock portions 33 lock into the respective rear cutout portions 51 to stop the rotation of the stator 40 and restrict retreating as illustrated in FIG. 10B. In the state, the inner surfaces of the respective receiving portions 32 excluding the lock portions 33 abut on an outer surface of the stator core 42 to hold the stator 40.

In the front side of the stator 40 and within the inner housing 3, a baffle plate 55 is assembled from the front. The baffle plate 55 has a ring shape with a front surface serving as a reversely tapered surface continuously connected to the front surface of the reversely tapered portion 30. On an upper and lower side of the baffle plate 55, a pair of small cylindrical portions 56 and 56 are disposed to protrude outward in a radial direction. The small cylindrical portions 56 and 56 fit to the slits 34 and 34 of the inner housing 3 to abut on the screw boss portions 35 and 35 from the front. The respective small cylindrical portions 56 have inner sides in the radial direction where front pressing portions 57 and 57 are integrally formed as illustrated in FIG. 5 and FIG. 9B. The front pressing portions 57 have lateral cross-sectional arc shapes that project radially inward with respect to an inner circumferential surface of the inner housing 3.

Figure 8B:
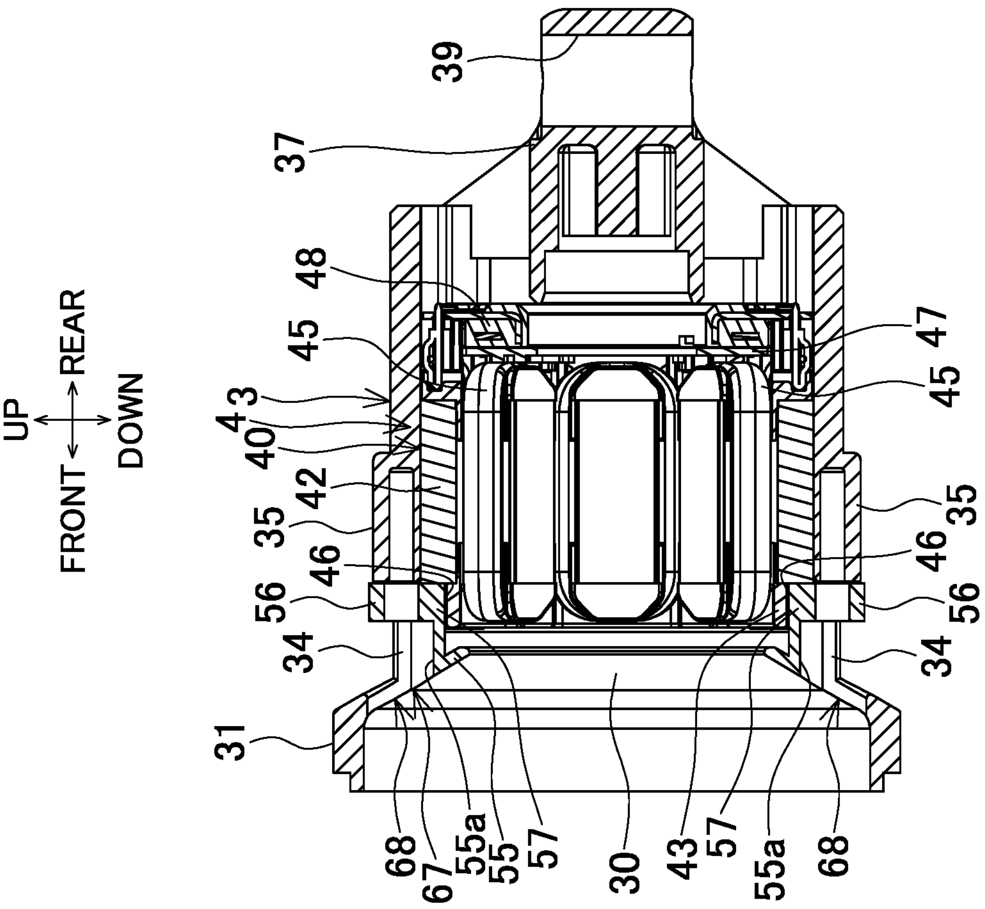
FIG. 8B is the explanatory drawing of the inner housing to which the stator and the baffle plate are assembled, showing a center vertical cross-sectional surface.
Figure 8A:
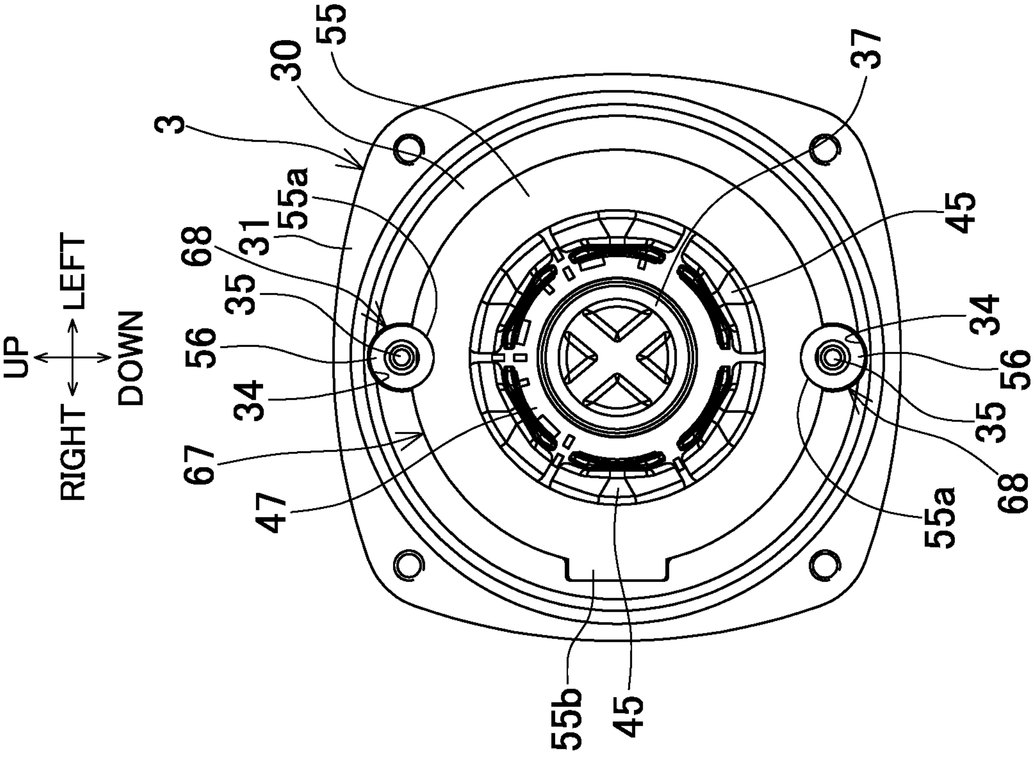
FIG. 8A is an explanatory drawing of the inner housing to which a stator and a baffle plate are assembled, in a front view.

The baffle plate 55 is assembled from the front to the inner housing 3 into which the stator 40 is inserted. The upper and lower small cylindrical portions 56 and 56 are positioned in a front side of the screw boss portions 35 and 35 via the slits 34 and 34 and pushed into rearward. Then, the front pressing portions 57 and 57 fit to the front cutout portions 46 and 46 of the front insulator 43 to abut on the front surface of the stator core 42 and position the stator 40 from the front as illustrated in FIG. 5, FIG. 8A, and FIG. 8B.

Under the positioning state, the reversely tapered portion 30 and the baffle plate 55 form a cone-shaped rectifier 67. The rectifier 67 is formed of the reversely tapered portion 30 positioned outside in the radial direction of the inner housing 3 and the baffle plate 55 positioned inside in the radial direction, in a rear side of a centrifugal fan 66 described later.

In the rectifier 67, through holes 68 and 68 having circular shapes in a front view are formed. The through holes 68 are formed in the front side of the screw boss portions 35 and 35 and the front pressing portions 57 and 57 at a position through the reversely tapered portion 30 and the baffle plate 55. The through holes 68 and 68 are formed of front ends in semicircular shapes in the front view of the slits 34 and 34 and depressed portions 55*a* and 55*a*. The slits 34 are formed to be cut out in the reversely tapered portion 30, and the depressed portions 55*a* in semicircular shapes in the front view are disposed on an outer diameter surface of the baffle plate 55. The baffle plate 55 has a front end right side where a protrusion 55*b* is formed. The protrusion 55*b* covers a cutout formed in the front surface of the reversely tapered portion 30 by the fitting protrusion 36 as illustrated in FIG. 6 and FIG. 7.

In the state, screws 58 and 58 that pass through the small cylindrical portions 56 and 56 from the front via the through holes 68 and 68 are screwed into the screw boss portions 35 and 35. Then, the front surface of the baffle plate 55 is continuously connected to the front surface of the reversely tapered portion 30 and the baffle plate 55 is secured at a position where the rectifier 67 is formed. Simultaneously, the baffle plate 55 sandwiches and secures the stator 40 with the lock portions 33.

The rotor 41 includes a rotation shaft 60 positioned in the axial center and the rotor core 61 arranged in a peripheral area of the rotation shaft 60. The rotor core 61 is formed of a plurality of laminated steel plates and has an approximately cylindrical shape. The rotor 41 includes the four plate-shaped permanent magnets 62, 62 . . . secured in an inside of the rotor core 61.

The rotation shaft 60 has a rear end pivotally supported by a bearing 63 held onto the bearing holder 37. The rotation shaft 60 has a front end pivotally supported via a bearing 65 on a partition plate 64 assembled between the gear housing 5 and the expanded portion 31 of the inner housing 3. In the state, the rotation shaft 60 has a distal end projecting into the gear housing 5. At the rear of the partition plate 64 and on the rotation shaft 60, the centrifugal fan 66 is mounted. The centrifugal fan 66 is housed through from the reversely tapered portion 30 of the inner housing 3 to the expanded portion 31 in the front side of the baffle plate 55. The rectifier 67 is opposed to a rear surface outer periphery of the centrifugal fan 66.

The inner housing 3 that holds the brushless motor 4 is elastically held by the outer housing 2. The following describes the elastic holding structure in detail.

Figure 11:
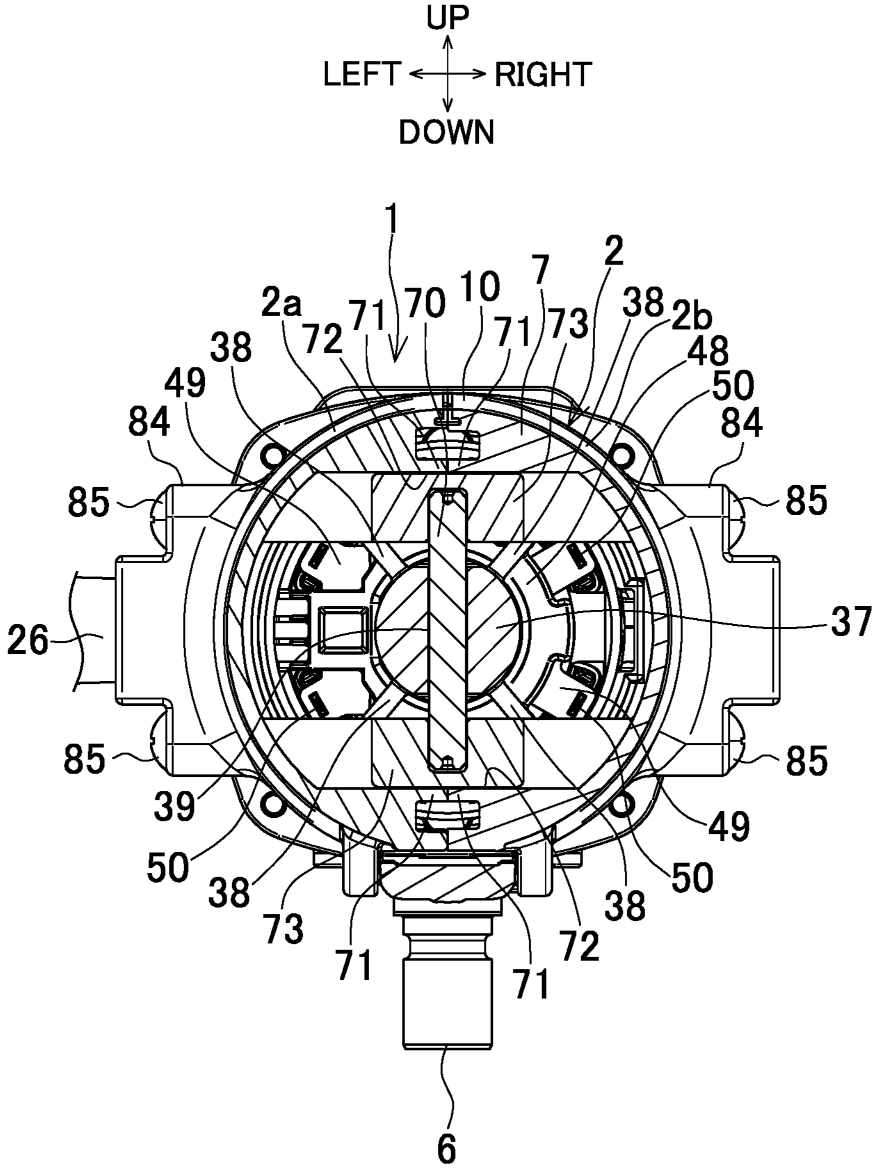
FIG. 11 is a cross-sectional view taken along a line F-F in FIG. 5.

A metallic coupling rod 70 passes through the through hole 39 of the bearing holder 37 of the inner housing 3 in the up-down direction. The coupling rod 70 has both upper and lower ends supported by a pair of upper and lower rod receiving portions 71 and 71 formed on the respective half housings 2*a* and 2*b* of the outer housing 2 as illustrated in FIG. 7 and FIG. 11. Each of the rod receiving portions 71 is in a cornered cylinder shape. The rod receiving portions 71 and 71 laterally opposing have mating surfaces on which insertion holes 72 and 72 of the coupling rod 70 are provided. Each of the insertion holes 72 has an inside where a rubber cap 73 that receives an end portion of the coupling rod 70 is held.

Since the coupling rod 70 that passes through a rear portion of the bearing holder 37 is supported by the rod receiving portions 71, the inner housing 3 is held swingable in right and left with the coupling rod 70 as a center. The coupling rod 70 as a supporting point has both the upper and lower ends elastically held onto the rod receiving portions 71 and 71 via the rubber caps 73 and 73.

The inner housing 3 has an outer periphery where a tubular rubber 74 is externally mounted in an attachable and detachable manner from the reversely tapered portion 30 to the rear portion. The tubular rubber 74 is interposed between the large diameter portion 10 of the outer housing 2 and the inner housing 3. The tubular rubber 74 has a front end whose upper and lower sides have arc-shaped flange portions 75 and 75 along a rear surface of the reversely tapered portion 30 as illustrated in FIG. 5 and FIG. 7. The tubular rubber 74 has the front end whose right and left sides have relief portions 76 and 76. The relief portions 76 has areas in contact with the reversely tapered portion 30, which are less than the flange portions 75 and 75 have.

Accordingly, the inner housing 3 swingable in the right and left with the coupling rod 70 as a center has the whole circumference of the front portion elastically held onto the outer housing 2 via the tubular rubber 74. Here, the rubber cap 73 has a hardness lower than that of the tubular rubber 74.

In the tubular rubber 74, at a position near the front end in upper and lower sides on an inner circumferential surface, a pair of inner positioning protrusions 77 and 77 are formed. The inner positioning protrusions 77 and 77 fit to the through holes 68 and 68 provided on the rectifier 67. In the state, the inner positioning protrusions 77 and 77 serve as spacers that cover front sides of the screws 58 and 58 securing the baffle plate 55. Simultaneously, the inner positioning protrusions 77 and 77 have front surfaces 77*a* and 77*a* that are continuous with the reversely tapered portion 30 and the front surface of the baffle plate 55 as illustrated in FIG. 5. At the rear of the respective inner positioning protrusions 77 and on the inner circumferential surface of the tubular rubber 74, respective groove portions 78 are formed in the front-rear direction. The groove portions 78 fit to the respective screw boss portions 35 of the inner housing 3.

The tubular rubber 74 has the inner circumferential surface on the right side where a positioning groove 79 is formed over the whole length. The positioning groove 79 fits to the fitting protrusion 36 of the inner housing 3.

On a rear end of the tubular rubber 74 and on right and left side surfaces, a pair of outer positioning protrusions 80 and 80 that project radially outward are formed. On right and left inner surfaces of the outer housing 2, a pair of receiving depressed portions 81 and 81 to which the outer positioning protrusions 80 and 80 fit are formed.

At the rear of the reversely tapered portion 30 and on the tubular rubber 74, a securing ring 82 is externally mounted. The securing ring 82 has the same outer diameter as the large diameter portion 10 and is made of metal. The securing ring 82 has both right and left side surfaces where a pair of plane surface portions 83 and 83 are formed in the up-down direction.

Figure 9A:
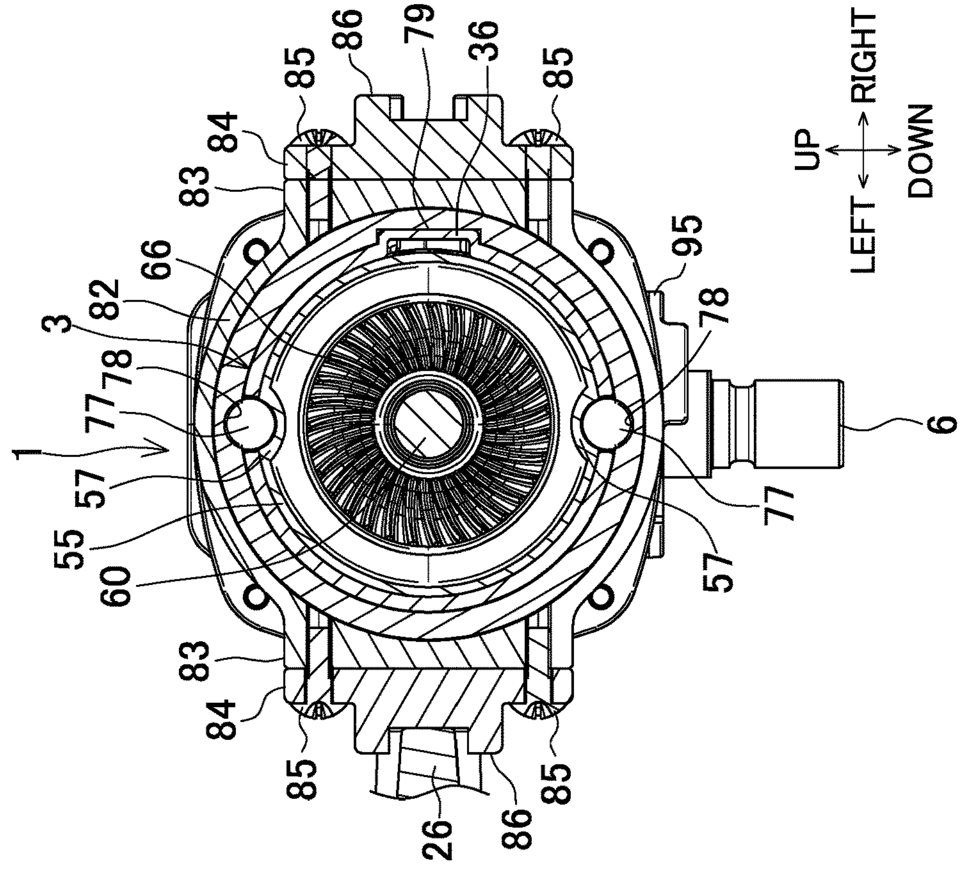
FIG. 9A is a cross-sectional view taken along a line B-B in FIG. 5.

On the front end and right and left side surfaces of the outer housing 2, as illustrated in FIG. 2, FIG. 6, and the like, a pair of handlebar mounting portions 84 and 84 are integrally formed. The handlebar mounting portions 84 and 84 project outward to the right and left from the outer housing 2 to extend forward to the outside of the gear housing 5. Each of the handlebar mounting portions 84 is for mounting a side handlebar 26 (for example, FIG. 1 and FIG. 2). Each of the handlebar mounting portions 84 is formed into a plate shape along a planar surface defined by the up-down and front-rear directions, and is not in contact with the outer surfaces of the inner housing 3 and the partition plate 64. The handlebar mounting portion 84 is screwed to the securing ring 82 with a pair of upper and lower screws 85 and 85 from outsides in the right and left while respective inner surfaces of the handlebar mounting portions 84 and 84 abut on the plane surface portions 83 and 83 of the securing ring 82 as illustrated in FIG. 9A. Thus, the right and left half housings 2*a* and 2*b* of the outer housing 2 are screwed and coupled also to the securing ring 82 via the handlebar mounting portions 84 and 84 besides being screwed and coupled to one another.

In each of the handlebar mounting portions 84, a framing portion 86 is disposed to protrude between the upper and lower screws 85 and 85. The framing portion 86 has an inside where a screw-hole 87 for screwing and securing a screw portion 27 disposed at a distal end of the side handlebar 26 is formed to pass through in the right-left direction as illustrated in FIG. 6.

On the other hand, the gear housing 5 is secured by screwing four screws 90, 90 . . . passed through from the front at four corners in a front view into the inner housing 3 via the partition plate 64 as illustrated in FIG. 1 and FIG. 2. A bevel gear 91 is fixedly secured to the front end of the rotation shaft 60 that projects into the gear housing 5. The bevel gear 91 engages with a bevel gear 92 fixedly secured to an upper end of the spindle 6 as illustrated in FIG. 4. The gear housing 5 has a front surface where a plurality of exhaust outlets 93, 93 . . . are formed and communicate with the inside of the inner housing 3 via a through-hole (not illustrated) provided on the partition plate 64. In front of the exhaust outlet 93, a shaft lock 94 is disposed. The shaft lock 94 is configured to lock the rotation of the spindle 6 via the bevel gear 92 by the push-in operation.

The spindle 6 is pivotally supported by an upper and lower bearings 96 and 96 held onto the gear housing 5 and a bearing box 95 assembled to a lower portion of the gear housing 5. The spindle 6 projects downward from the bearing box 95 and has a lower end on which the tool bit 97 is mountable. The bearing box 95 has an outer periphery on which a wheel cover (not illustrated) that covers a rear half portion of the tool bit 97 is mountable.

In the grinder 1 configured as described above, the lock off lever 19 is rotated using fingers gripping the rear cylinder portion 8 to release the lock. In the state, the switch lever 16 is gripped in. Then, as described above, the pressing plate 18 pushes in the plunger 13 to turn the main switch 12 into the ON operation first. Accordingly, the power source from the battery pack 11 is supplied to the control circuit board 21 of the controller 20.

When the switch lever 16 is further gripped in, the lock off lever 19 presses the button portion 15 of the micro switch 14, and the micro switch 14 is turned into the ON operation. Then, the control circuit board 21 that has obtained an ON signal of the micro switch 14 activates the brushless motor 4 by supplying the power source that can be obtained from the battery pack 11 to the brushless motor 4. Accordingly, the rotation shaft 60 rotates together with the rotor 41 to rotate (right-hand rotation viewing from the upper side) the spindle 6 via the bevel gears 91 and 92. Thus, a grinding operation and the like with the tool bit 97 are made possible.

Here, the rotor 41 of the brushless motor 4 that rotates at high speed and the tool bit 97 mounted on the spindle 6 have respective unbalances, and therefore, the unbalances causes a vibration and the vibration is transmitted to the inner housing 3 and the gear housing 5.

However, the tubular rubber 74 is interposed between the inner housing 3 and the outer housing 2. Therefore, the vibration is effectively insulated to reduce the vibration to the outer housing 2. Accordingly, the vibration is less likely to be transmitted to a hand of an operator gripping the rear cylinder portion 8 as the main handlebar. Since the side handlebar 26 is also mounted on the handlebar mounting portion 84 of the outer housing 2 where the vibration is insulated, the vibration is less likely to be transmitted to the hand of the operator gripping the side handlebar 26, thereby ensuring achieving a low vibration.

Furthermore, when the brushless motor 4 is activated or when a load is applied on the tool bit 97 during the rotation, the inner housing 3 attempts to rotate in a left-hand rotation direction (a reactive force direction) in a plan view with the coupling rod 70 as a center. However, since the tubular rubber 74 is interposed between the inner housing 3 and the outer housing 2, the rotation of the inner housing 3 is buffered with the tubular rubber 74, and thus, a back action is less likely to be transmitted to the outer housing 2 and the side handlebar 26 mounted on the outer housing 2.

On the other hand, when the centrifugal fan 66 rotates in association with the rotation of the rotation shaft 60, an external air is suctioned from the air inlet 24 at the rear to move forward inside the outer housing 2 meandering around the controller 20 from the lower side. Accordingly, the controller 20 and the terminal block 25 are cooled.

An airflow inside the outer housing 2 passes the main switch 12 and the micro switch 14 and cools each of them. Afterwards, the airflow enters the inner housing 3, passes between the stator 40 and the rotor 41 of the brushless motor 4, and cools the brushless motor 4. Afterwards, the airflow passes through the expanded portion 31 from the rectifier 67, and reaches the gear housing 5 via the partition plate 64, and is discharged to the outside from the exhaust outlet 93.

The control circuit board 21 detects an acceleration rate with the acceleration sensor 23 while the brushless motor 4 is driving. The detected acceleration rate is compared with a threshold preliminarily recorded in a storage unit, such as a ROM. The threshold is based on values of the acceleration rate generated when a kickback (a phenomenon that the tool body 1*a* furiously bounces back to a side of the operator when the tool bit 97 sticks in to a workpiece or hits something hard) or a swinging (a phenomenon that the tool bit 97 is locked by a workpiece to rotate the tool body 1*a* with the spindle 6 as a center) occurs during the operation. Accordingly, when the detected acceleration rate exceeds the threshold, the control circuit board 21 stops the driving of the brushless motor 4.

Here, the tubular rubber 74 is interposed between the inner housing 3 having a vibration source and the outer housing 2 having the rear cylinder portion 8 and the side handlebar 26 gripped by the operator. Accordingly, the vibration generated during the ordinary operation is reduced and is not transmitted to the acceleration sensor 23. Therefore, durability of the acceleration sensor 23 can be ensured, and in addition, a false detection less likely to occur, thereby ensuring accurately determining the acceleration rate when the kickback or the swinging occurs.

The grinder 1 of the above-described configuration includes the inner housing 3 that houses the brushless motor 4 (a motor), the spindle 6 (a final output shaft) downwardly disposed in front of the brushless motor 4, and the outer housing 2. Inside the outer housing 2, the inner housing 3 is disposed, and the outer housing 2 is integrally disposed with the rear cylinder portion 8 (a handle). The inner housing 3 and the outer housing 2 are coupled in a relatively rotatable manner via the coupling rod 70 (a coupling shaft) extending in the predetermined direction. On the other hand, the inner housing 3 is held onto the outer housing 2 via the tubular rubber 74 (an elastic body) disposed in front of the coupling rod 70. The tubular rubber 74 is provided with each of the inner positioning protrusions 77 and the inner positioning grooves 79 (inner positioning portions) that position the inner housing 3 and the outer positioning protrusions 80 (outer positioning portions) that position the outer housing 2.

The configuration ensures accurately positioning both the housings 2 and 3 even if the tubular rubber 74 is interposed between the inner housing 3 and the outer housing 2, thereby obtaining an effective vibration insulation effect.

In particular, the inner housing 3 is in the tubular shape extending in the front-rear direction, and the tubular rubber 74 is in the ring shape externally mounted on the inner housing 3. Accordingly, an equal vibration insulation effect can be obtained over the whole circumference.

The outer positioning portion is the outer positioning protrusion 80 that projects radially outward from the tubular rubber 74 and engages with the receiving depressed portion 81 formed on the inner surface of the outer housing 2. Accordingly, the outer housing 2 can be easily positioned.

The inner positioning portion is the inner positioning groove 79 (an inner positioning depressed portion) disposed to depress on the inner surface of the tubular rubber 74. The fitting protrusion 36 formed on the outer surface of the inner housing 3 fits to the inner positioning groove 79. As the inner positioning portion, the inner positioning protrusions 77 and 77 (inner positioning protrusions) are also employed. The inner positioning protrusions 77 are disposed to protrude on the inner surface of the tubular rubber 74 and engage with the slits 34 formed in the inner housing 3. Accordingly, the inner housing 3 can be easily positioned.

The coupling rod 70 is disposed in the up-down direction at the rear end of the inner housing 3. Accordingly, the inner housing 3 can be supported swingable in the right-left direction, thereby being effective as a buffer during the kickback.

The outer housing 2 is divided into the right and left half housings 2*a* and 2*b*, and the outer positioning protrusions 80 and 80 are disposed in a right and left pair to engage with the respective half housings 2*a* and 2*b*. Accordingly, the outer housing 2 in a half structure can be positioned in a balanced manner.

On both the right and left sides at the front end of the tubular rubber 74, the relief portions 76 and 76 are formed. The relief portions 76 have the reduced contacted area to the outer housing 2 compared with both the upper and lower sides. Accordingly, while the swing of the inner housing 3 to the right and left (the right and left on a rotational surface of the tool bit 97) is permitted to some extent, a buffering effect by the tubular rubber 74 is obtainable.

The coupling rod 70 passes through the inner housing 3 and has both ends held onto the outer housing 2 via the rubber cap 73 (a second elastic body). Accordingly, the coupling rod 70 is also elastically supported to lead to an improvement of the vibration insulation effect.

In the disclosure according to positioning of the housing, in the above-described configuration, the fitting protrusion and the inner positioning groove are disposed on the right side. However, the fitting protrusion and the inner positioning groove may be disposed on the left side or on both the right and left sides. They may be disposed in a position other than the right or left. The specific shape between the protrusion and the groove can be changed. The relationship between the protrusion and the groove may be inverted.

While as the inner positioning portion, the inner positioning protrusion that engages with the slit of the inner housing is also employed, the specific shape can also be changed in this case, for example, into a depressed portion, instead of the slit. However, the inner positioning portion by the slit and the inner positioning protrusion can be omitted.

For the outer positioning portion, the number and the arrangement of the outer positioning protrusion and the receiving depressed portion can also be changed as necessary. The relationship between the protrusion and the depressed portion may be inverted.

The coupling shaft may be integrally formed with the bearing holder, unlike the above-described coupling rod, which is a separated component from the inner housing. The direction of the coupling shaft is not limited to the up-down direction.

For the elastic body, the shape of the tubular-shaped rubber can be changed as necessary. The tubular-shaped rubber may be divided or another elastic body may be added.

Figure 12:
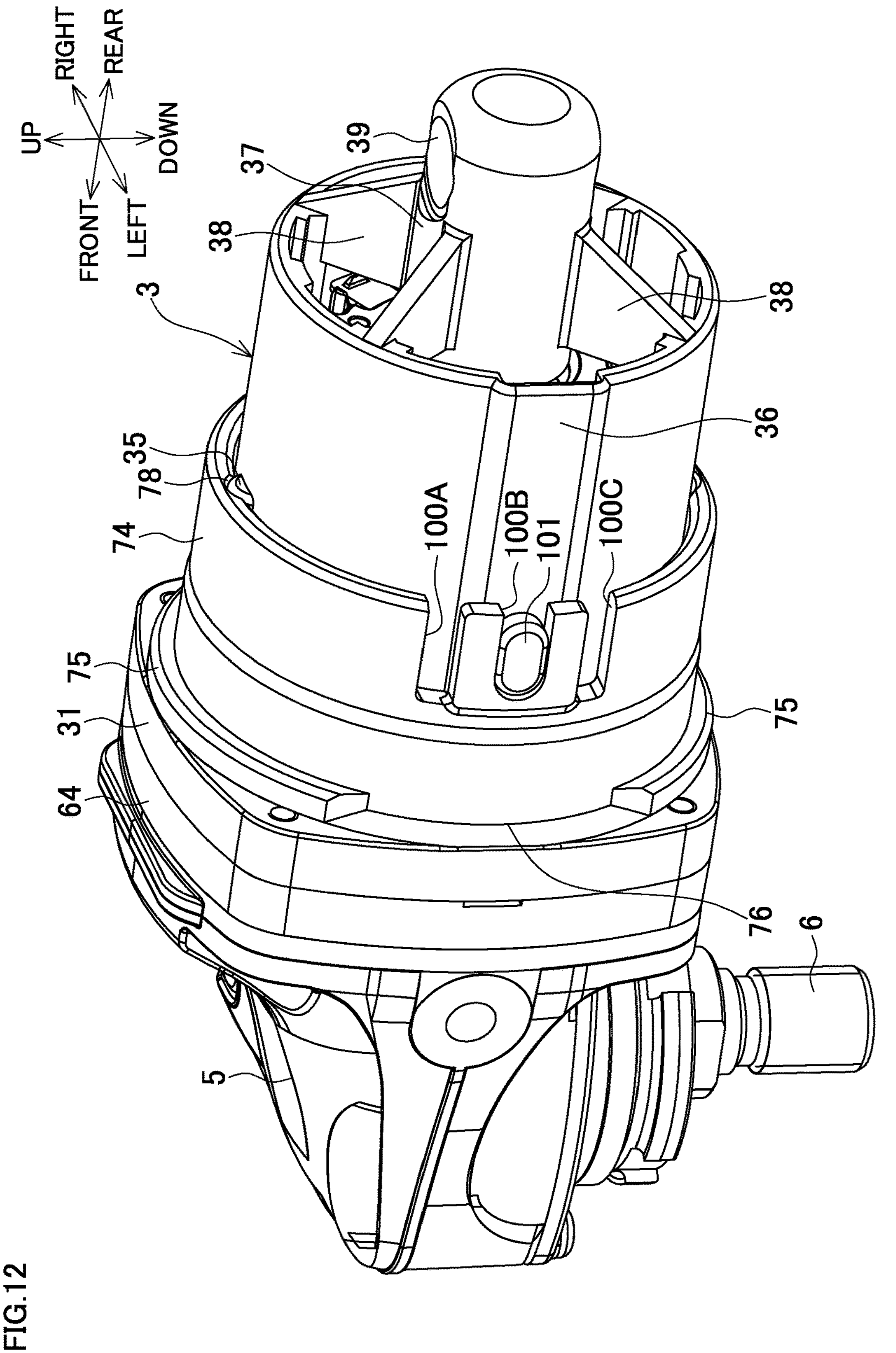
FIG. 12 is a perspective view of a front side portion (an outer housing is omitted) of a grinder showing a modification example of a positioning structure of the outer housing and the inner housing.
Figure 13:
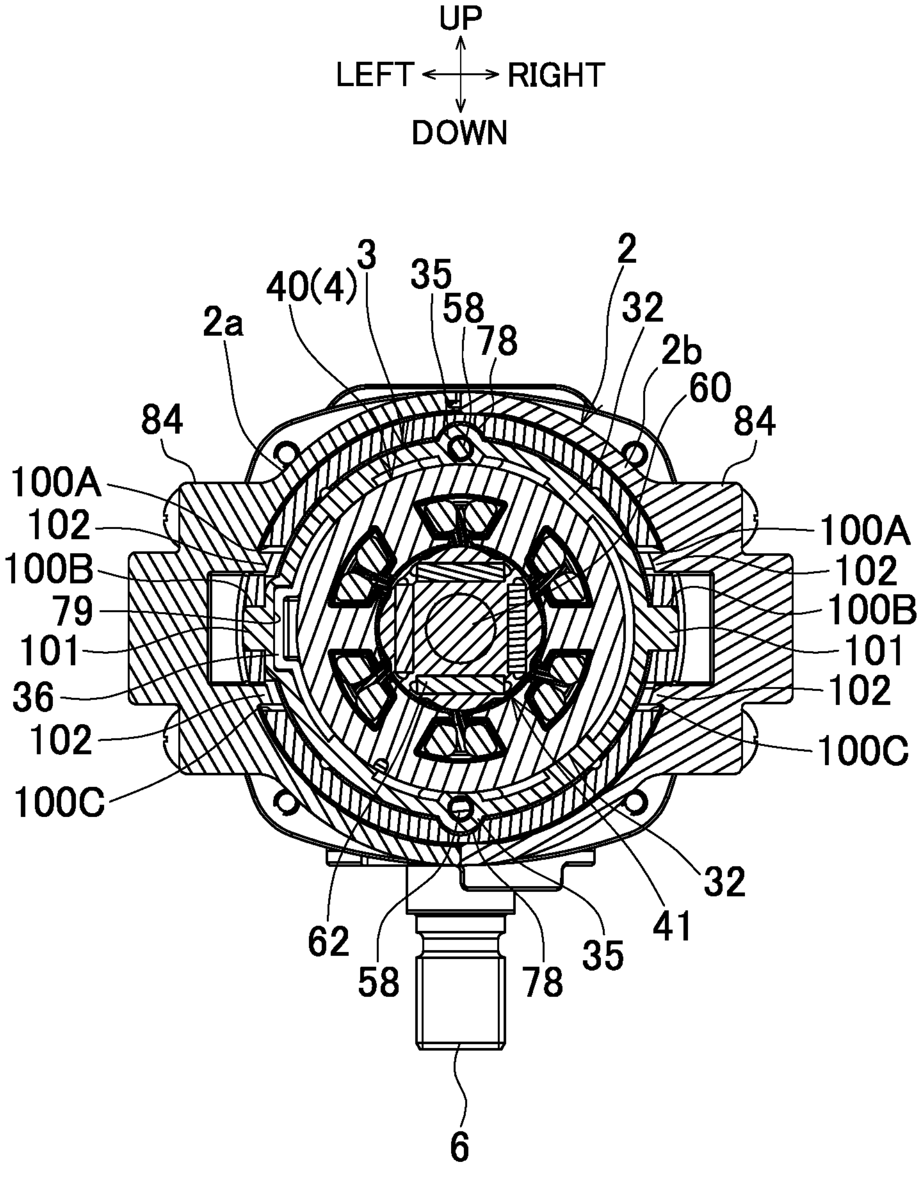
FIG. 13 is a cross-sectional view corresponding to the line D-D showing the modification example of the positioning structure of the outer housing and the inner housing.

FIG. 12 and FIG. 13 illustrates another modification example of the positioning structure of the outer housing 2 and the inner housing 3.

On the right and left side surfaces of the tubular rubber 74, three cuts 100A to 100C are formed forward from the rear end with a predetermined interval in the circumferential direction. On the right and left outer surfaces of the inner housing 3, inner side projections 101 and 101 that lock to the center cuts 100B and 100B are formed. On the right and left inner surfaces of the outer housing 2, a pair of upper and lower outer side projections 102 and 102 are each disposed to lock to the upper and lower cuts 100A and 100C. It should be noted that the fitting protrusion 36 and the inner positioning groove 79 are disposed in the left side, and the left side inner side projection 101 is formed on the outer surface of the fitting protrusion 36.

Accordingly, in the assembled state, the inner side projections 101 and 101 lock to the right and left cuts 100B and 100B of the tubular rubber 74 to position the inner housing 3. The respective outer side projections 102 and 102 lock to the right and left cuts 100A and 100C of the tubular rubber 74 to position the outer housing 2. Under the positioning state, the tubular rubber 74 is in a form of being sandwiched between the inner side projections 101 and the outer side projections 102 in the circumferential direction of the tubular rubber 74.

Thus, the modification example has a structure as follows. The inner positioning portion is the cut 100B (an inner side locked portion) to which the inner side projection 101 that projects outward from the inner housing 3 locks. The outer positioning portions are the cuts 100A and 100C (outer side locked portions) to which the outer side projections 102 and 102 that project inward from the inner surface of the outer housing 2 locks. The inner side projections 101 and the outer side projections 102 sandwich the tubular rubber 74 in the circumferential direction of the tubular rubber 74.

Accordingly, a relative rattling between the outer housing 2 and the inner housing 3 is restricted in the circumferential direction of the tubular rubber 74, thereby ensuring positioning with high reliability. Since a protrusion portion like an outer positioning protrusion is not provided in the tubular rubber 74 as in the former configuration, it is possible to avoid reduced durability and positioning function of the tubular rubber 74 caused by, for example, a damage on the protrusion portion.

Note that the inner side locked portion and the outer side locked portion are not limited to a cut, but may be a through-hole or a depressed portion. The shapes and the numbers of the inner side projection and the outer side projection are changeable.

In the disclosure, the configuration in which the handlebar mounting portion is disposed on the outer housing is not necessary. Even when the handlebar mounting portion is disposed on the gear housing as the conventional cases, a certain vibration reduction effect by the elastically holding of the inner housing can be obtained.

The outer housing may have an integral tubular shape similarly to the inner housing, not in a half structure as in the above-described configuration. Conversely, the inner housing may be formed of a plurality of components, such as a half structure.

The grinder 1 in the above-described configuration includes the tool body 1*a* and the spindle 6. The tool body 1*a* houses the brushless motor 4. The spindle 6 rotates by the driving of the brushless motor 4, and the tool bit 97 is mounted to the spindle 6. The grinder 1 also includes the acceleration sensor 23 and the controller 20. The acceleration sensor 23 is disposed within the tool body 1*a*. The controller 20 monitors the acceleration rate detected by the acceleration sensor 23 to control the driving of the brushless motor 4. The acceleration sensor 23 is elastically supported in the tool body 1*a*.

The configuration eliminates possibilities of a false detection of the acceleration rate based on the vibration generated during the ordinary use and a failure in accurately determining the acceleration rate by the kickback and the swinging. A possibility that the acceleration sensor 23 itself is broken down or damaged by the vibration is also reduced. Accordingly, the acceleration sensor 23 accurately detects the kickback and the swinging phenomenon, thereby being high in reliability. The durability of the acceleration sensor 23 can be ensured.

In particular, the tool body 1*a* includes the inner housing 3 (a drive side housing) that houses the brushless motor 4 and the outer housing 2 (a vibration insulation side housing) that elastically holds the inner housing 3. The acceleration sensor 23 is located in the outer housing 2. Accordingly, the vibration reduction effect for the acceleration sensor 23 can be effectively obtained.

The outer housing 2 holds the inner housing 3 in a front side, and the acceleration sensor 23 is disposed in a rear side with respect to the inner housing 3. Accordingly, the acceleration sensor 23 can be disposed at a position apart from the vibration source, thereby being effective in reducing the vibration.

The outer housing 2 has a rear cylinder portion 8 (a handlebar) including the switch lever 16 (an operation member) for driving the brushless motor 4, and the acceleration sensor 23 is disposed in a rear side with respect to the rear cylinder portion 8. Accordingly, the acceleration sensor 23 can be disposed at a position farther than a position of the vibration source. In particular, since the battery pack 11 having a heavy weight is disposed at the rear end of the outer housing 2, the acceleration sensor 23 is disposed close to the battery pack 11, thereby further effective in reducing the vibration. The controller 20 is disposed in the outer housing 2 and the acceleration sensor 23 is disposed in the controller 20. Accordingly, the acceleration sensor 23 can be easily disposed to the vibration insulation side together with the controller 20.

In the disclosure according to the elastic support of the acceleration sensor, the arrangement of the acceleration sensor is not limited to the above-described configuration. For example, without directly mounting the acceleration sensor on the control circuit board, the acceleration sensor and the control circuit board disposed away from the controller may be coupled with a lead wire.

The acceleration sensor may be disposed within the rear cylinder portion or the front cylinder portion, not limited in the battery mounting portion.

The acceleration sensor may be disposed in a region in the outer housing where it overlaps with the inner housing. In this case, the elastic support is also possible by using the tubular-shaped rubber.

The disclosure can be employed in the grinder without having the vibration insulation structure. In this case, it is only necessary to elastically support only the acceleration sensor in the tool body or the controller including the acceleration sensor with an elastic body, such as a rubber.

It is also possible to control the driving of the motor as follows. For example, a second acceleration sensor is disposed in the drive side housing. The controller is caused to monitor a difference of respective acceleration rates detected from the acceleration sensor of the vibration insulation side housing and the second acceleration sensor. The difference is compared with the threshold.

The grinder 1 in the above-described configuration includes the inner housing 3 (the housing) that houses the brushless motor 4 (the motor) and the centrifugal fan 66 (the fan) that rotates in association with the driving of the brushless motor 4 to generate a cooling air for the brushless motor 4 within the inner housing 3. The grinder 1 also includes the reversely tapered portion 30 and the expanded portion 31 (the tubular portion) formed in the inner housing 3 and houses the centrifugal fan 66, and the rectifier 67 disposed to be opposed to the centrifugal fan 66 in the upstream side of the cooling air. The rectifier 67 is divided into the inside and outside in the radial direction of the reversely tapered portion 30 and the expanded portion 31. The outside in the radial direction is formed of the reversely tapered portion 30 and the inside in the radial direction is formed of the baffle plate 55 assembled to the inner housing 3.

The configuration ensures forming the rectifier 67 using a part of the inner housing 3 and the baffle plate 55, and thus, avoiding the increased axial length of the inner housing 3 or any useless space. Accordingly, the rectifier 67 can be formed in a structure that is compact in the axial direction and space-saving.

In particular, the baffle plate 55 has the front pressing portion 57 (an abutting portion) that abuts on the stator 40 of the brushless motor 4 in the axial direction of the stator 40. Accordingly, the stator 40 can be positioned using the baffle plate 55.

The baffle plate 55 secures the stator 40 with the front pressing portion 57 by being screwed to the inner housing 3. Accordingly, the stator 40 is also securable simultaneously with securing the baffle plate 55.

The through hole 68 (a screw passing portion) that passes though the screw 58 screwing the baffle plate 55 is disposed on the rectifier 67. Accordingly, the screw 58 can be disposed at a position close to the inner housing 3 and the stator 40, and the downsizing of the inner housing 3 can be maintained.

The screw passing portion is the through hole 68 formed through the reversely tapered portion 30 and the baffle plate 55. Accordingly, without significantly changing the shape of the rectifier 67, the screw passing portion can be formed.

The inner positioning protrusion 77 (a spacer) is attachably and detachably disposed in the inner housing 3. The inner positioning protrusion 77 forms a continuous surface with the reversely tapered portion 30 and the baffle plate 55 by covering the through hole 68 after the baffle plate 55 is screwed. Accordingly, even though the through hole 68 is provided, the function of the rectifier 67 is not reduced.

The outer housing 2 coupled via the tubular rubber 74 (the elastic body) is disposed outside the inner housing 3, and the inner positioning protrusion 77 is formed as a part of the tubular rubber 74. Accordingly, the inner positioning protrusion 77 can be easily assembled together with the tubular rubber 74.

The inner positioning protrusion 77 positions the inner housing 3 with respect to the tubular rubber 74. Accordingly, positioning of the inner housing 3 using the tubular rubber 74 can be easily performed.

Note that, in the disclosure according to the rectifier, the number and the position of the screws screwing the baffle plate are not limited to the above-described configuration. It is possible to screw the baffle plate from the rear side, not from the front side. The baffle plate may be screwed in a radial direction.

The screw passing portion is not necessarily provided through the reversely tapered portion of the inner housing and the baffle plate, but may be provided only on any one side. The spacer does not have to be used for positioning the inner housing, but may cover the screw passing portion as a separate body from the elastic body such as the tubular-shaped rubber.

The baffle plate is not limited to be screwed, but can employ a structure without using the screw, such as securing an integrally formed lock piece by being locked to the inner housing.

The disclosure is applicable to, not limited to the grinder, but also an angle drill, a reciprocating saw, a circular saw, and the like insofar as it is an electric power tool including a fan and a rectifier in the tubular portion of the housing. Accordingly, it is not limited to have the outer housing and the inner housing. The fan may be disposed on another shaft that is rotationally transmitted from the output shaft, not on the output shaft of the motor.

In addition, in common to the respective disclosures, other configurations of the grinder are not limited to the above-described configurations. For example, the motor is not limited to a brushless. A plurality of the battery packs (batteries) may be used as the power source. It may be an AC tool without using a battery.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A rotating tool comprising:

a tool body that houses a motor;

a final output shaft that rotates in association with driving of the motor and on which a tool bit is mounted;

an acceleration sensor disposed within the tool body;

a controller that monitors an acceleration rate detected by the acceleration sensor to control the driving of the motor; wherein the acceleration sensor is elastically supported in the tool body, the tool body includes a drive side housing that houses the motor and a vibration insulation side housing that elastically holds the drive side housing, the vibration insulation side housing has a handlebar including an operation member for driving the motor, and the acceleration sensor is disposed in a rear side with respect to the handlebar with the handlebar located between the sensor and the final output shaft in an axial direction of the tool body.

2. The rotating tool according to claim 1, wherein the acceleration sensor is located in the vibration insulation side housing.

3. The rotating tool according to claim 2, wherein the vibration insulation side housing holds the drive side housing in a front side, and the acceleration sensor is disposed in a rear side with respect to the drive side housing.

4. The rotating tool according to claim 2, wherein the controller is disposed in the vibration insulation side housing, and the acceleration sensor is disposed in the controller.

5. The rotating tool according to claim 4, wherein the controller incudes a control circuit board, and the acceleration sensor is mounted on the control circuit board.

6. The rotating tool according to claim 2, wherein the drive side housing is an inner housing that includes the final output shaft, and the vibration insulation side housing is an outer housing that is integrally disposed with the handlebar and inside which the inner housing is disposed.

7. The rotating tool according to claim 6, wherein the inner housing and the outer housing are coupled in a relatively rotatable manner via a coupling shaft extending in a predetermined direction.

8. The rotating tool according to claim 7, wherein the inner housing is held onto the outer housing via an elastic body disposed in front of the coupling shaft.

9. The rotating tool according to claim 8, wherein the inner housing is in a tubular shape extending in a front-rear direction, and the elastic body is in a ring shape externally mounted on the inner housing.

10. The rotating tool according to claim 7, wherein the coupling shaft is disposed in an up-down direction at a rear end of the inner housing.

11. The rotating tool according to claim 7, wherein the coupling shaft passes through the inner housing and has both ends held onto the outer housing via an elastic body.

12. The rotating tool according to claim 6, wherein electronic parts excluding the motor are housed within the outer housing.

13. The rotating tool according to claim 6, wherein the outer housing includes a battery pack serving as a power source.

14. The rotating tool according to claim 1, wherein the acceleration sensor includes a three-axis acceleration sensor element.

15. The rotating tool according to claim 1, wherein the controller includes a storage unit and stops the driving of the motor when the acceleration rate detected by the acceleration sensor exceeds a threshold preliminarily recorded in the storage unit.

16. A rotating tool comprising:

a tool body that houses a motor;

a final output shaft that rotates in association with driving of the motor and on which a tool bit is mounted;

an acceleration sensor disposed within the tool body;

a controller that monitors an acceleration rate detected by the acceleration sensor to control the driving of the motor; wherein the acceleration sensor is elastically supported in the tool body, the tool body includes a drive side housing that houses the motor and a vibration insulation side housing that elastically holds the drive side housing, the acceleration sensor is located in the vibration insulation side housing, and a tubular rubber being interposed between the vibration insulation side housing and the drive side housing.

17. The rotating tool according to claim 16, wherein the vibration insulation side housing holds the drive side housing in a front side, and the acceleration sensor is disposed in a rear side with respect to the drive side housing.

18. The rotating tool according to claim 16, wherein the controller is disposed in the vibration insulation side housing, and the acceleration sensor is disposed in the controller.

19. The rotating tool according to claim 16, wherein the drive side housing is an inner housing that includes the final output shaft, and the vibration insulation side housing is an outer housing that is integrally disposed with the handlebar and inside which the inner housing is disposed.

20. The rotating tool according to claim 16, wherein the acceleration sensor includes a three-axis acceleration sensor element.

* * * * *